Jan. 16, 1934.  L. DURNER  1,943,954

PRESSURE GAUGE DAMPING DEVICE

Filed Aug. 7, 1931

INVENTOR
Loren Durner

BY HIS ATTORNEY

H. G. Manning

Patented Jan. 16, 1934

1,943,954

UNITED STATES PATENT OFFICE 1,943,954

PRESSURE GAUGE DAMPING DEVICE

Loren Durner, Waterbury, Conn.

Application August 7, 1931. Serial No. 555,730

6 Claims. (Cl. 137—111)

This invention relates to hydraulic pressure gauges and indicating devices, and more particularly to an attachment for connection with a pressure gauge which will dampen the pulsations in pressure transmitted to said gauge from a variable-pressure hydraulic system.

One object of this invention is to provide a damping device or shock absorber for a hydraulic pressure gauge which will protect the gauge from injury and prevent the needle of the gauge from vibrating too rapidly.

A further object is to provide a pressure gauge damping device which will operate as efficiently on low pressures as on high pressures, and which will instantly adjust itself for operation at any desired pressure.

A further object is to provide a device of the above nature which will be relatively simple in construction, inexpensive to manufacture, easy to install and manipulate, compact, ornamental in appearance, and very efficient and durable in use.

With these and other objects in view there has been illustrated on the accompanying drawing one form in which the invention may be conveniently embodied in practice.

Figure 1:
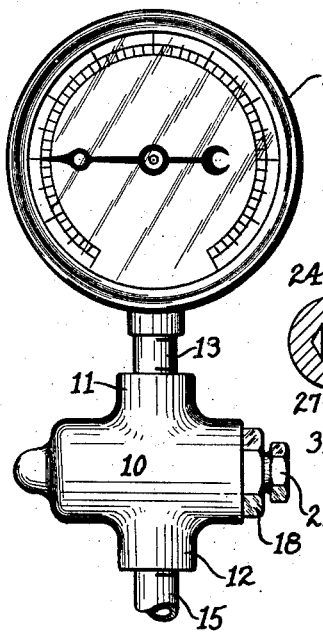
Fig. 1 represents a front elevation on a reduced scale of a pressure gauge having the improved damping device connected thereto.

In previous damping devices or shock absorbers for hydraulic pressure gauges, when the device was adjusted to work satisfactorily at high pressures, it was practically useless for operation at low pressures. Such previous devices included needle valves and other fixed-position hand-adjusted devices.

By means of the present invention, the above and other disadvantages have been avoided and a damping attachment has been provided which will operate entirely automatically and will be capable of instantly adjusting itself for variations in pressure from zero to well over 2000 pounds per square inch.

Referring now to the drawing in which like reference numerals denote corresponding parts throughout the several views, the numeral 10 indicates a casing having upper and lower tapped bosses 11 and 12, the boss 11 being connected with a threaded pipe 13 leading to a pressure gauge 14, and the boss 12 being connected to a threaded pipe 15 leading to a source of hydraulic pressure such as a hydraulic power transmission or pump.

The casing 10 is provided with a cylindrical chamber 16 having an open tapped end closed by a threaded stuffing box 17, the latter having a hexagonal head 18 for convenience in manipulation.

The wall of the cylindrical chamber 16 is provided at its central section with a continuous shallow circumferential groove 19 for a purpose to be hereinafter described. A hollow piston 20 is fitted within the cylindrical chamber 16 and is connected to a piston rod 21 which is slidably fitted within the stuffing box 17, with the outer free end of said piston rod 21 working in a headed gland 22, as clearly shown in Fig. 2. A packing 23 is provided at the inner end of the gland 22 to prevent possibility of leakage of liquid from the chamber 16.

At the opposite end of the chamber 16 from the stuffing box 17, provision is made of an extension guide recess 24 located in alinement with the piston rod and connected to a vertical passage 25. A cylindrical stop plug 26 is located in the passage 25, the lower face of said stop plug being adapted to engage the upper flat surface of a semi-cylindrical reduced section 27 on the left-hand end of a tubular member 28, as viewed in Fig. 2. The right-hand end of the member 28 is fitted over a reduced section 29 of the piston rod 21 to which it is rigidly secured, as by a rivet 30. The tubular member 28 is provided at its left-hand end with an interior longitudinal passage 31 for communication with the guide recess 24, said passage 31 being adapted to be closed by a ball valve 32. A small coiled spring 33 is provided between said ball valve 32 and the reduced end 29 of the piston rod 21 for urging said valve 32 toward its seat at all times.

Figure 2:
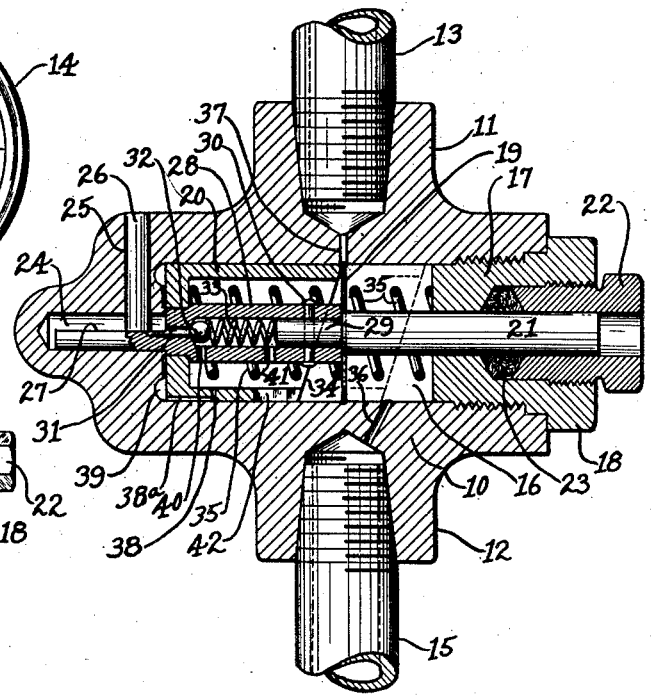
Fig. 2 is an enlarged longitudinal sectional view of the damping device.
Figure 3:
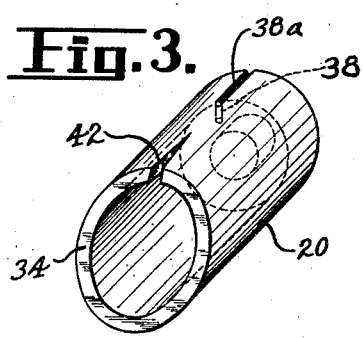
Fig. 3 is an enlarged detail perspective view of the operating piston, shown upside down and detached from the piston rod.

The right-hand open end of the cup-shaped piston 20, as viewed in Fig. 2, has a beveled or truncated face 34, and said piston is adapted to be pressed at all times toward the left by a large coiled spring 35 surrounding said piston rod 21 and said tube 28.

The pressure from the pipe 15 is communicated to the chamber 16 by means of a small inclined inlet passage 36, and said pressure is communicated to the pressure gauge 14 through a vertical outlet passage 37 leading into the threaded pipe 13 and located in alinement with the circumferential groove 19, previously mentioned.

A V-shaped slot 42 is cut in the lower right-hand short end of the piston 20 so that no matter how high the pressure becomes, the communication between the inlet and outlet passages 36 and 37 will never be completely shut off.

Operation

When the pressure in the hydraulic system increases, a small quantity of oil (or other hydraulic liquid) will flow from the chamber 16 through a bleed hole 38 and a longitudinal groove 38ª formed in the left-hand end of the piston 20, from which it will be received in an annular recess 39 formed in the casing 10 beyond said piston. It is to be noted that a small raised annulus is provided around the front end of the guide recess 24 and prevents the piston 20 from seating solidly against the flat base of the chamber 16 included within the annular recess 39. Since the effective area of the left-hand side of the piston will thus be greater than that of the right-hand side, the piston will be forced to the right by the unbalanced force due to the greater pressure exerted on said left-hand side until checked by the compression of the spring 35.

It will be clearly understood that the inclined or beveled end 34 of the piston 20 will obstruct the circumference of the groove 19 to a greater or less extent depending upon its longitudinal position within the chamber 16 and will correspondingly increase the path of hydraulic liquid through which the pressure pulsations must be transmitted from the inlet passage 36 to the outlet passage 37. When the pressure in the chamber 16 falls momentarily, the spring 35 will force the piston 20 rapidly to the left due to the fact that the check valve ball 32 will open automatically against the pressure of its spring 33. Liquid will then be permitted to flow from the tube 28 to the interior of the cylinder 16 through a pair of openings 40 and 41.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a device for damping the vibrations transmitted from a hydraulic pressure system, a casing having a chamber, said chamber having inlet and outlet ports and a circumferential groove extending about the interior wall thereof and in alinement with said outlet port, a spring-pressed cup-shaped piston slidable within said chamber, said piston having a beveled end cooperating with said circumferential groove, there being a recess between the closed end of the piston and the wall of said chamber adjacent said closed end and a passage affording communication between said recess and the interior of said piston, whereby fluid under pressure entering said chamber will be transmitted to said recess to move said piston against the action of the spring pressing on the piston to shut off direct communication between said inlet and outlet ports and cause said fluid under pressure to be transmitted through a portion of said groove to said outlet in accordance with the average pressure existing in the hydraulic system.

2. In a device for damping the pulsations transmitted from a hydraulic pressure system, a casing having an interior chamber, a hollow spring-pressed piston slidable within said chamber and having a beveled face on one end, said chamber having inlet and outlet ports in its circumference, and having a circumferential groove in alinement with said outlet port, means for connecting said outlet port to a pressure gauge, the pressure from said system being transmitted through a variable portion of said groove to said gauge depending upon the position of said piston in said chamber, said piston having means including a check valve adapted to open when the pressure in the system diminishes to permit the piston to rapidly return to wide open position, but being closed when said pressure increases to retard the speed of the piston as it traverses the groove.

3. In a device for damping the vibrations transmitted from a hydraulic pressure system, a casing having an interior chamber, a spring-pressed piston slidable within said chamber, said chamber having inlet and outlet ports in its circumference and having a transverse groove therein in alinement with said outlet port, said piston serving to obstruct the flow from the inlet to the outlet to a variable degree depending upon its position within said casing, means for causing the piston to move in a direction to increase the obstruction of the flow when the pressure in the system increases, and means to cause said spring to rapidly move the piston in a direction to reduce the obstruction when the pressure in the system decreases.

4. In a device for damping the vibrations transmitted from a hydraulic pressure system, a casing having an interior chamber, a spring-pressed piston slidable within said chamber, said chamber having inlet and outlet ports in its circumference and having a transverse groove therein in alignment with said outlet port, said piston serving to obstruct the flow from the inlet to the outlet to a variable degree depending upon its position within said casing, means for causing the piston to move slowly in a direction to increase the obstruction when the pressure in the system increases, and means to cause said spring to move the piston in a direction to reduce the obstruction when the pressure in the system decreases.

5. In a device for damping the vibrations transmitted from a hydraulic pressure system, a casing having an interior chamber, a spring-pressed hollow piston slidable within said chamber, said chamber having inlet and outlet ports in its circumference, said piston serving to obstruct the flow from the inlet to the outlet to a variable degree depending upon its position within said casing, means for causing the piston to move in a direction to increase the obstruction of flow when the pressure in the system increases, and a check valve in said piston adapted to open when the pressure diminishes to permit said spring to rapidly move the piston in a direction to reduce the obstruction when the pressure in the system decreases.

6. In a device for damping the vibrations transmitted from a hydraulic pressure system, a casing having an interior chamber, a spring-pressed piston slidable within said chamber, said chamber having inlet and outlet ports in its circumference and having a transverse groove therein in alinement with said outlet port, said piston serving to obstruct the flow from the inlet to the outlet to a variable degree depending upon its position within said casing, means including a by-pass of sufficient size to cause the piston to move slowly in a direction to increase the obstruction when the pressure in the system increases, and means to cause said spring to move the piston in a direction to reduce the obstruction when the pressure in the system decreases.

LOREN DURNER.